S. FIELDMAN.
CHEESE MOLD.
APPLICATION FILED AUG. 27, 1921.
1,418,242.
Patented May 30, 1922.
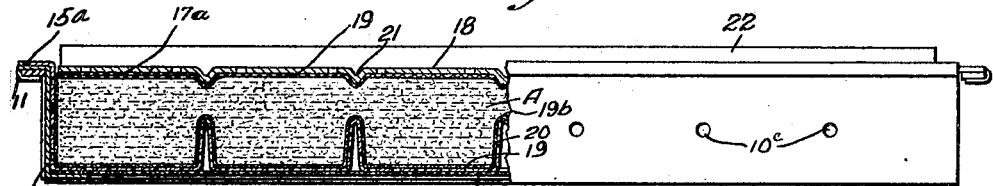
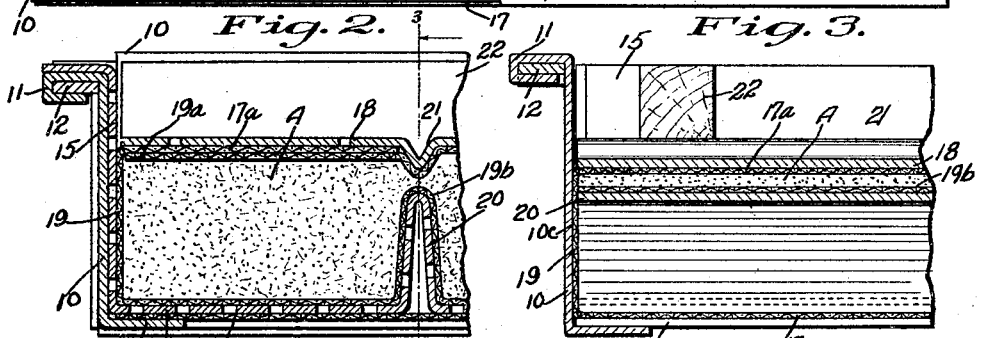
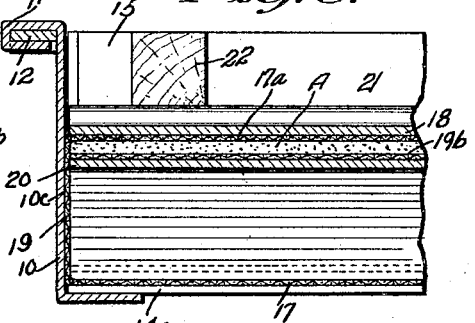
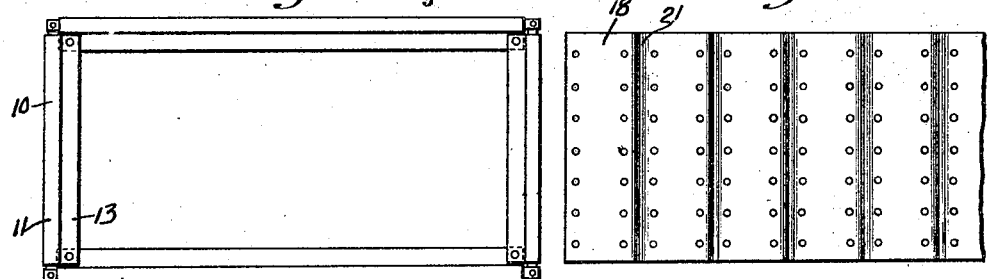
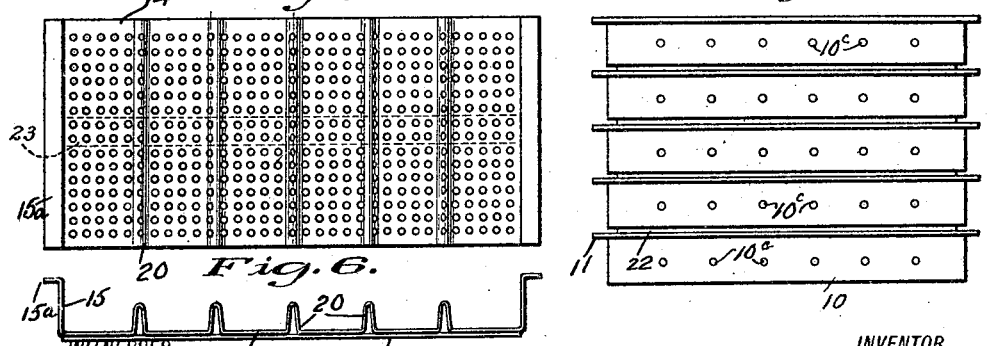
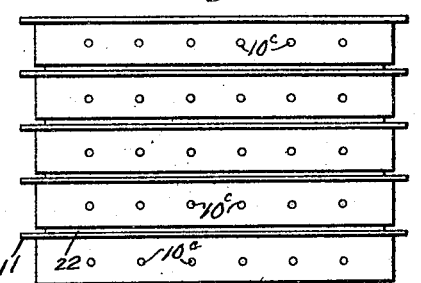
INVENTOR
SAMUEL FIELDMAN
BY
ATTORNEYS

UNITED STATES PATENT OFFICE.

SAMUEL FIELDMAN, OF NEW YORK, N. Y.

CHEESE MOLD.

1,418,242.  Specification of Letters Patent.  Patented May 30, 1922.

Application filed August 27, 1921. Serial No. 495,921.

*To all whom it may concern:*

Be it known that I, SAMUEL FIELDMAN, a citizen of the United States, and a resident of the city of New York, borough of Manhattan, in the county and State of New York, have invented new and Improved Cheese Molds, of which the following is a description.

My invention relates to cheese molds of the type in which a plurality of molds are placed in a press.

The general object of my invention is to provide a cheese mold improved in various particulars to the end that ample provision may be made for the escape of the whey from the mold when in the press; and whereby to promote convenience in the assembling and disassembling of the mold and placing and removing the cheese, as well as to make provision for ready and thorough cleaning of the mold.

The nature of the invention and its distinctive features and advantages will clearly appear as the description proceeds.

Reference is to be had to the accompanying drawings forming a part of this specification, it being understood that the drawings are merely illustrative of one example of the invention.

Figure 1 is a partly sectional side elevation of a cheese mold embodying my invention, the parts being shown in the positions they occupy when the mold is not under pressure;

Figure 2 is a similar view of a fragment of the press on an enlarged scale, the parts being shown in the positions they occupy when subjected to pressure in a press;

Figure 3 is a transverse vertical section on the line 3—3, Figure 2;

Figure 4 is a plan view of the frame;

Figure 5 is a plan view of the perforated element forming the bottom and two ends of the press;

Figure 6 is a side edge view of the element shown in Figure 5;

Figure 7 is a plan view of the follower of the mold;

Figure 8 represents diagrammatically several of the molds in stacked form as arranged when in a press.

In carrying out my invention in accordance with the illustrated example, a rectangular frame 10 is provided. The upper edges of the sides of the frame 10 are turned about a top frame 12 to present an outwardly directed flange extending about the frame and at the bottom the frame has inwardly directed flanges 13 at the four sides.

Within the frame 10 above the bottom flanges 13 is a removable foraminous element 14 extending over the bottom of the mold through which the whey is afforded free escape. The frame 10 also has holes 10° at the sides for the escape of the whey. Said element 14 has upturned ends 15 having outwardly directed terminal flanges 15$^a$ to lie over the flanges 11. A strip 17 of muslin or like fabric is placed beneath the element 14 between the same and the bottom flanges 13 and has a length to extend upwardly at opposite sides of the mold to be turned over as at 17$^a$ onto the cheese A when the latter is placed in the mold. A second strip 19 of fabric is placed on top of the element 14 and the cheese A is placed on top of said fabric 19.

A perforated follower plate 18 is provided to fit within the element 14 above the muslin strips 17 and 19. The strip 19 of fabric has a length so that its ends 19$^a$ may be turned over on top of the strip 17 for both to lie beneath the follower 18.

The element 14 and the follower plate 18 are formed with members that coact to constitute partitions in the mold. Thus the element 14 has high transverse ribs 20 stamped up therein, the sides of the ribs being separated so that the whey escaping through the perforations of the ribs may have free escape. Similarly, the top follower plate 18 has transverse ribs 21 stamped therein to project downwardly at the under side of said plate in alinement with the ribs 20. The layer of fabric 19 extends over the ribs 20, as at 19$^b$.

The arrangement is such that under the pressure of the press the ribs 21 of the follower plate will approach close to the ribs 20 beneath but not quite in contact therewith so as to leave a thin web of cheese between the respective ribs, said web of cheese being severed by the workman after the cheese is removed from the mold. The ribs 20 extend to a height to form the major portion of the partitions so that only short depressed ribs 21 are required in the follower whereby to not unduly strain the fabric 19 under the pressure.

Sticks or wood strips 22, preferably square, in cross section, are provided, one at each side of the mold and adapted to range lengthwise therein, said strips resting on the follower plate 18. The mold is filled with cheese to a height so that the pressure strips 22 will project above the top plane of the frame 10 and when several molds are disposed in stacked form as in Figure 8 one mold will rest on the strips 22 of the mold beneath. Thus, when pressure is applied the strips 22 will press the follower 18 downwardly against the cheese squeezing out the whey, the pressing movement continuing until the strips 22 are forced to the plane of the mold, the contact of the molds limiting the relative movements of the molds under pressure.

A metal strip 23 is fixed to the foraminous element along the bottom thereof to extend across the several ribs 20, said strip serving to strengthen said element and specifically serving to prevent spreading of the ribs 20.

The fabric strips 17, 19 are not the usual cheese-cloth to be applied to the cheese but consist of muslin to strain the cheese by permitting the whey to pass through it retaining the more solid matter.

The prime purpose of forming the foraminous element 14 separate from the frame 10 is to permit layers of fabric 17, 19 being laid beneath said element 14 and on top of said element so that the ends of the upper layer 19 may be carried above the cheese and overlap onto the turned-over sides 17ª of the fabric 17. It is to be observed that the upturned sides 15 of the element 14 lie within the frame 10 and against opposite perforated sides thereof, whereby the frame backs up and braces the upturned ends 15 and thereby prevents distortion of the element 14 while affording escape for the whey through the perforations of the frame.

I would state in conclusion that while the illustrated example constitutes a practical embodiment of my invention, I do not limit myself strictly to the exact details herein illustrated, since, manifestly, the same can be considerably varied without departure from the spirit of the invention, as defined in the appended claims.

Having thus described my invention, I claim:

1. A cheese mold including a frame having holes in its sides for the escape of whey, a foraminous element removably fitting in said frame at the bottom and having upturned ends, a foraminous follower plate fitting within said element and adapted to be disposed above the cheese, in the mold, and separate elongated pressure strips accommodated in the frame above the follower plate to receive the pressure when the mold is in a press.

2. A cheese mold including a frame having holes in its sides for the escape of whey, a foraminous element removably fitting in said frame at the bottom and having upturned ends, a foraminous follower plate fitting within said element and adapted to be disposed above the cheese in the mold, and separate elongated pressure strips accommodated in the frame above the follower plate to receive the pressure when the mold is in a press; together with a fabric strip in the mold beneath said foraminous element, said strip having a length to be turned inwardly over the cheese between the latter and the follower plate, and a second fabric strip on top of said foraminous element and disposed at right angles to the first strip, the ends of the second-mentioned strip having a length to be folded at its ends over the first strips.

3. A cheese mold including a frame, a foraminous element removably fitting said frame and constituting the bottom of the mold, said element having upturned ends rising to the top of the mold, a follower plate fitting within said element adapted to be disposed above the cheese in the mold, and a pressure element on said follower plate of a height to initially project above the frame, said pressure element adapted to respond to pressure to recede within the plane of the top of the mold.

4. A cheese mold including a frame, and a foraminous bottom element separate from and detachably supported on said frame to permit of layers of straining fabric being employed both beneath and on top of said element.

5. A cheese mold including a bottomless frame having perforated sides, and a separate foraminous element extending across the bottom of said frame and detachably supported thereon, the foraminous ends of said element extending upwardly into and being covered and backed up by opposite sides of said frame to provide resistance to the pressure.

6. A cheese mold including a bottomless frame having perforated sides and a separate perforated element extending across the bottom of said frame and having upturned portions extending laterally outward over the top of the frame and detachably supported by the latter, said upturned portions extending into the frame to lie along the inner faces of the opposite perforated sides of said frame.

7. A cheese mold having partition ribs rising from the bottom thereof, and a brace strip extending over the bottom across said ribs.

8. A cheese mold including a bottomless frame having perforated sides, and a separate perforated element extending across the bottom of said frame and having upturned ends extending upwardly at the inside of the frame to be backed by the latter, said element being open at the sides between said upturned ends for the direct escape of whey through the adjacent perforated sides of the frame.

SAMUEL FIELDMAN.